United States Patent [19]

Guerro et al.

[11] E Patent Number: Re. 33,773

[45] Reissued Date of Patent: Dec. 17, 1991

[54] METHOD OF MANUFACTURING A SAG-RESISTANT BONDED PARTICULATE MATTER

[75] Inventors: Gerald J. Guerro, Trumbell, Conn.; Gregory G. Borsinger, Boonton, N.J.

[73] Assignee: American Cyanamid Company, Stamford, Conn.

[21] Appl. No.: 570,193

[22] Filed: Aug. 20, 1990

Related U.S. Patent Documents

Reissue of:

[64] Patent No.: 4,942,085
Issued: Jul. 17, 1990
Appl. No.: 433,984
Filed: Nov. 15, 1989

U.S. Applications:

[63] Continuation-in-part of Ser. No. 299,284, Jan. 23, 1989, abandoned.

[51] Int. Cl.[5] ..... D04H 1/58

[52] U.S. Cl. ..... 428/288; 427/385.5; 427/393.6; 428/290

[58] Field of Search ..... 427/385.5, 393.6; 428/288, 290

[56] References Cited

U.S. PATENT DOCUMENTS

| | | | |
|---|---|---|---|
| 4,158,574 | 6/1979 | Cummisford et al. | 127/32 |
| 4,524,093 | 6/1985 | Devry | 427/389.9 |
| 4,756,714 | 7/1988 | Hendrix et al. | 8/115.6 |

*Primary Examiner*—Michael Lusignan
*Attorney, Agent, or Firm*—Steven H. Flynn

[57] ABSTRACT

A method for the production of improved bonded particulate articles, and the articles so produced, are disclosed. Specifically, the manufacture of particulate articles having a reduced tendency to undergo humidity-induced sag is disclosed. These articles have utility in such application as ceiling tiles.

19 Claims, No Drawings

METHOD OF MANUFACTURING A SAG-RESISTANT BONDED PARTICULATE MATTER

Matter enclosed in heavy brackets [ ] appears in the original patent but forms no part of this reissue specification; matter printed in italics indicates the additions made by reissue.

CROSS-REFERENCE TO RELATED APPLICATION

This application *is a reissue application of our original U.S. Pat. No. 4,942,085 dated July 17, 1990, Ser. No. 07/433,984, filed Nov. 15, 1989, which* is a continuation-in-part application of U.S. Ser. No. 07/299,284 filed Jan. 23, 1989, now abandoned.

FIELD OF INVENTION

This invention relates to a method of manufacturing improved bonded particulate articles and to the articles so produced. More particularly, the present invention relates to a method of manufacturing improved particulate tiles which possess a reduced tendency to exhibit humidity-induced sag and to the particulate tiles so produced.

BACKGROUND OF THE INVENTION

Maintaining stiffness or rigidity of bonded particulate tile articles under high humidity conditions has long been a problem in the particulate tile industry. This problem is of particular concern since the articles are typically used in ceilings and supported only around their perimeters. Humidity weakens the tile and due to the perimeter-only support often induces an unacceptable sag of the tile.

The resistance of particulate tiles to moisture has previously been improved by applying a coating comprised of a melamine-formaldehyde resin. However, use of this resin, due to its formaldehyde content, is of concern due to the existence of regulations involving worker exposure during production of the resin and its application to the particulate tiles. Moreover, the environmental hazards associated with the use of this resin does not end with the manufacturing process since tiles bearing this coating release noxious and undesirable vapors under conditions such as those encountered in fires. Less noxious materials which exhibit satisfactory performance with regard to preventing humidity-induced sag of the particulate tiles to which they are applied have not heretofore been found.

U.S. Pat. No. 4,611,445 discloses a ceiling tile resistant to sag when exposed to a fire comprising mineral wool fibers having distributed therein from about 11% to about 6% by weight, based on the weight of the fibers, of lithium carbonate or the fused decomposition product thereof. This coating, however, is not useful in preventing humidity-induced sag.

Various methods have been utilized in the corrugated paper art to reduce the degradation of paper strength due to moisture contact. Impregnating paper with certain resins, e.g. ureas, melamines, and phenolics, is known, but the use of such resins has only limited utility in the manufacturing of particulate tiles because these resins cure at normal paper machine temperatures and tiles coated therewith become excessively brittle during their processing. Moreover, many of these processes use coatings as noxious as those of which we seek to avoid to use.

U.S. Pat. No. 4,400,480 relates to a method of preparing water resistant paperboard through use of a cross-linking additive for starch-based adhesive compositions. These compositions are prepared by reacting acetone and formaldehyde under aqueous alkaline conditions at 20°-380° C. in a molar ratio of 1 mole acetone: 2-5.5 moles of formaldehyde. An effective amount of free formaldehyde is reduced to about 0.1-2% by weight. The resulting reaction product can then be added to a starch-based adhesive or first mixed with dimethylol dihydroxy ethylene urea. Due to its formaldehyde content, this resin has the same environmental and exposure concerns discussed earlier and therefore does not represent an improvement over the currently practiced art.

U.S. Pat. No. 4,600,439 discloses a coating composition for paper or cardboard, comprising a fluidizing agent and an undepolymerized starch, optionally modified, a synthetic product, such as polyvinylalcohol, or a protein, such as casein or soya proteins.

U.S. Pat. No. 3,858,273 discloses a method of improving the wet rigidity of corrugated paperboard through its impregnation with a slow-curing glyoxal-based resin in the presence of a catalyst and, optionally, an extender, such as a starch.

U.S. Pat. No. 3,288,631 discloses a method for the production of non-woven fiber webs that are stable in the presence of water comprising a water-soluble bonding agent having both hydroxyl- and carbonyl-groups and a water-soluble resin and metal salt capable of reacting with the aforementioned groups.

The above-mentioned paper coating methods are inadequate for use in the production of sag resistant tiles due to their failure to impart adequate moisture resistance and/or rigidity to a tile, thereby allowing the tile to exhibit an unacceptable degree of humidity-induced sag.

Unexpectedly, it has now been discovered that a class of materials previously used in the manufacture of paper products is useful in the prevention of humidity-induced sag in bonded particulate articles, such as ceiling tiles.

SUMMARY OF THE INVENTION

The present invention relates to a method of preventing or minimizing humidity-induced sag in bonded particulate articles comprising applying to at least one side of a particulate substrate a coating composition comprising water, a binder resin comprising the reaction product of glyoxal resin or derivative thereof and a starch, and a filler material and then curing the coating composition on said particulate substrate.

The present invention further relates to bonded particulate articles which are resistant to humidity-induced sag which are produced in accordance with the method claimed herein.

DETAILED DESCRIPTION

The substrates useful in the practice of the claimed are those such as those present in commercially available particulate tiles. These substrates are generally comprised of processed fiberous materials such as mineral wool as disclosed in U.S. Pat. No. 4,611,445. These substrates can be found in commercially available dropped ceiling tiles currently used in residential construction.

The binder resin useful in the production of the coating composition and the practice of the present invention comprises resin component and a starch component. The resin component of this invention may be any suitable slow-curing glyoxal resin or derivative thereof. Examples include the reaction product of glyoxal, urea, and formaldehyde. This component may be prepared, for example, by first heating the glyoxal resin and the urea to form a monourein which is then treated with formaldehyde or by reacting glyoxal and formaldehyde and then adding the urea. Typical compounds useful as the resin component include, but are not limited to, dimethylol dihydroxy ethylene urea, partially alkylated dimethylol dihydroxy ethylene urea wherein said alkyl group contain from 1 to about 8 carbon atoms, alkylated dimethylol dihydroxy ethylene urea wherein said alkyl group contain from 1 to about 8 carbon atoms, and tetramethylol glycoluril. Preferred are dimethylol dihydroxy ethylene urea and tetramethylol glycoluril.

The starch component of the binder resin may be selected from any of the several starches, heretofore employed in starch adhesive compositions. Suitable starches include, for example, those starches derived from corn, potato, waxy maize, sorgum, wheat, as well as high amylopectin starches and the various derivatives of those starches. Hence, among the applicable starches are included the various starch derivatives such as ethers, esters, thin-boiling types prepared by known processes such as phosphorylation, mild acid treatments and oxidation. The starch component of the binder resin should further resist retrogradation. High solids, low viscosity starches containing less than about 50% by weight of insolubles are preferred. Particularly preferred is potato starch.

The fillers useful in the practice of the instant invention are not critical and may comprise organic fillers, inorganic fillers or mixtures thereof. They may generally be selected from such materials as alumina silicates, alkali metal carbonates, clays, silica, mineral wools and and mixtures thereof, many of which are commercially available. Preferred are fillers with low acid demand. Most preferred are fillers such as silica, kaolin, bentonite, mineral wools and clays.

The resin and starch components of the binder resin are present in amounts ranging from about 1:3 to about 2:1 parts by weight. More preferably, they are present in amounts ranging from about 2:3 to about 3:2 on the same basis. Most preferably, they are present in equivalent amounts.

The coating composition may further comprise any one or a combination of a wide variety of acid or latent acid catalysts, such as for example metal salts, amine hydrochlorides, carboxylic acids, hydroxy-substituted carboxylic acids, alkoxy-substituted carboxylic acids, and the like, and mixtures thereof. Examples include, but are not limited to, magnesium chloride, magnesium nitrate hexahydrate, magnesium acetate tetrahydrate, zinc chloride, zinc nitrate, zinc borofluoride, zinc silicofluoride, zinc nitrate hexahydrate, zinc acetate dihydrate, ammonium chloride, ammonium nitrate, ammonium sulfate, ammonium phosphates, sodium hydrogen sulfate, potassium persulfate, strontium nitrate, zirconium acetate, zirconium ammonium carbonate, zirconium oxychloride, aluminum acetate, chromium acetate, tartaric acid, citric acid, oxalic acid, lactic acid, succinic acid, valeric acid, maleic acid, phosphoric acid, boric acid, sulfonic acid, perchloric acid, persulfuric acid, p-toluenesulfonic acid, methoxyacetic acid, hydroxybutyric acid, glycolic acid, the hydrochloride of 2-amino-2-methyl-1-propanol, and the like, and their mixtures. The catalyst is used in an amount ranging from about 1 to about 50, and preferably about 12 to about 15, percent based on the total weight of the binder resin.

The coating compositions of this invention are aqueous dispersions prepared by mixing water, the binder resin components, and the catalyst if employed. The order of addition of these materials is not critical. The coating composition should contain 20–75 percent by weight of solids (i.e. binder resin and filler) and preferably 30–60 percent on the same basis.

The coating composition is applied to at least one side of the particulate substrate in the practice of the present invention. The coating composition should be applied such that subsequent to its curing, it forms a layer having a dry coating weight of at least about 1 to about 100 grams/ft$^2$ on said substrate. More preferably, the coating composition is present in a dry coating weight of at least about 5 to about 40 grams/ft$^2$.

Application of the coating composition to said substrate may be accomplished in a number of ways all well known is the art. For example, it may be sprayed on the substrate or applied to said substrate by way of roller(s) contacting both said coating composition and said substrate. The use of a combinstion of spray and roller application is further within the scope of the present invention.

The coated substrate is then heated to a temperature of about 200° to 700° F., preferably from about 250° to 375° F., for a time suitable to result in its cure. A time period of about 30 seconds to 4 minutes is suitable while a period of about 30 seconds to 2 minutes is preferred. As used herein, curing denotes the promotion of the formation of a reaction product of said starch and the glyoxal resin or derivative thereof.

The following Examples illustrate several embodiments of the present invention and are not to be construed as a limitation of its scope. All parts and percentages are by weight unless otherwise indicated. All temperature values are given in degrees Celsius unless otherwise noted.

EXAMPLES

Definitions

Resin A is a melamine/formaldehyde resin marketed by American Cyanamid Company under the tradename Aerotru, 23.

Resin B is a mixture of dimethyol dihydroxy ethylene urea marketed by American Cyanamid Company under the designation of Aerotex 900 and a potato starch which had previously been boiled at a temperature exceeding its gelatinazation temperature in a 50:50 weight ratio.

Resin C is a resin previously employed in the paper coating art consisting of a 70:30 mixture of polyacrylamide and glyoxal.

Resin D is a mixture of a 1:9 weight ration of a urea glyoxial derivative marketed by American Cyanamid Company under the designation Parez 802 and an acid hydrolyzed starch containing 70–85% insolubles.

Resin E is the reaction of a 1:1 weight ratio of dimethylol dihydroxy ethylene urea marketed by American Cyanamid Company under the designation of Aerotex 900 and an acid hydrolyzed starch containing 70–85% insolubles.

Composition A is an aqueous dispersion containing a mixture of a Resin A and alumina silicate in a 1:3 ratio.

A catalytic amount of $ZnNO_3$ was used in its preparation.

Composition B is an aqueous dispersion containing a mixture of a Resin B and alumina silicate in a 1:3 ratio. A catalytic amount of $ZnNO_3$ was used in its preparation.

Composition C is an aqueous dispersion containing a mixture of a Resin C and alumina silicate in a 1:2 ratio. A catalytic amount of $ZnNO_3$ was used in its preparation.

Composition D is an aqueous dispersion containing a mixture of a Resin D and alumina silicate in a 1:1 ratio. A catalytic amount of $ZnNO_3$ was used in its preparation.

Composition E is an aqueous dispersion containing a mixture of a Resin E and alumina silicate in a 1:3 ratio. A catalytic amount of $ZnNO_3$ was used in its preparation.

Composition F is identical to Composition B except that the ratio of Resin B to filler is 1:2.

COMPARATIVE EXAMPLE 1

A 4×2 foot particulate ceiling tile was coated with Composition A on one side thereof through the use of a pilot roll coater. The Composition was then cured at a temperature of about 400°-600° F. for about 1-2 minutes. The coating was present in a dry coating weight of about 8-12 g/ft$^2$.

The coated tile was then installed in the ceiling of a humidity-controlled chamber such that the uncoated side of the tile was exposed to the interior of the chamber. The tile was secured in place through the use of a supporting flange around its entire perimeter. The relative humidity of the chamber's interior was then varied between about 85% and about 35% several times over a period of several hours. The relative humidity of the chamber was then adjusted to and maintained at a value of about 35% for a period sufficient to allow the tile to stabilize. The deflection of the tile was then measured. Deflection as used herein denotes the vertical distance from the center of the tile surface normal to the plane of the supporting flanges. As it represents the degree of humidity-induced sag of the tile, less tile deflection denotes improved performance of a coating composition. Tile deflection with the use of Composition A was found to be 81 mils.

EXAMPLE 1

The procedure of Comparative Example 1 was repeated except that Composition B was used in place of Composition A.

Tile deflection was determined to be about 125 mils.

COMPARATIVE EXAMPLE 2

The procedure of Comparative Example 1 was repeated except that Composition C was used in place of Composition A.

Tile deflection was determined to be about 420 mils.

COMPARATIVE EXAMPLE 3

The procedure of Comparative Example 1 was repeated except that Composition D was used in place of Composition A.

Tile deflection was determined to be about 398.

COMPARATIVE EXAMPLE 4

The procedure of Comparative Example 1 was repeated except that Composition E was used in place of Composition A.

Tile deflection was determined to be about 410.

EXAMPLE 2

The procedure of Comparative Example 1 was repeated except that Composition F was used in place of Composition A.

Tile deflection was determined to be about 44.5 mils.

The following observations may be made upon reviews of the above Examples and Comparative Examples.

First, the coating composition of the present invention (Composition B) gives satisfactory results. However, at a given binder resin to filler ratio, it does not minimize tile deflection to the degree accomplished by the currently-employed melamine/formaldehyde-containing coating composition (Composition A). However, results superior to those exhibited the use of Composition A can be achieved through the use of materials within the scope of the present invention by employing decreased binder to filler ratios, (e.g. Composition F).

Secondly, Composition C, which is material typically used in the paper coating industry, was shown to be wholly inadequate for the production of sag-resistant coated particulate materials.

Finally, coating compositions containing starch components having a high content of insoluble components (Composition D) are further shown to exhibit unsatisfactory performance.

We claim:

1. A method of preventing or minimizing humidity-induced sag in bonded particulate substrates comprising applying to at least one side of said particulate substrate a coating composition comprising an aqueous dispersion of a mixture of an effective amount of a glyoxal resin or derivative thereof and an effective amount of a starch compound *which contains less than about 50% by weight of insolubles*, and an effective amount of a filler material, and curing said coating composition.

2. The method of claim 1 wherein said glyoxal resin of said coating composition is selected from the group consisting of dimethylol dihydroxy ethylene urea, partially akylated dimethylol dihydroxy ethylene urea alkylated dimethylol dihydroxy ethylene urea and tetramethylol glycoluril.

3. The method of claim 2 wherein the glyoxal resin is dimethylol dihydroxy ethylene urea.

4. The method of claim 1 wherein said substrate comprises processed fiberous material.

5. The method of claim 1 wherein said starch component is selected from the group consisting of starches derived from corn, potatoes, waxy maize, sorgum and wheat.

6. The method of claim 1 wherein said starch component comprises a high amylopectin starch.

[7. The method of claim 1 wherein said starch components contains less than about 50% weight percent of insolubles.]

8. The method of claim 1 wherein the filler comprises an alumina silicate.

9. The method of claim 1 wherein the filler is selected from the group consisting of alkali metal carbonates, kaolin, bentonite, clays, silica, mineral wool and mixtures thereof.

10. The method of claim 1 wherein the filler is silica.

11. The method of claim 1 wherein the glyoxal resin and said starch component are present in amounts ranging from about 1:3 to about 2:1 by weight.

12. The method of claim 11 wherein the glyoxal resin and said starch component are present in amounts ranging from about 2:3 to about 3:2 by weight.

13. The method of claim 1 wherein the coating composition further comprises an acid catalyst which is present in amounts ranging from about 1 to about 50 weight percent based upon the weight of the glyoxal resin and said starch compound.

14. The method of claim 13 wherein the catalyst is selected from the group consisting of zinc nitrate, zirconium ammonium carbonate, ammonium sulfate and mixtures thereof.

15. The method of claim 1 wherein the coating composition is applied to said substrate in quantities such that subsequent to its curing it will form a layer upon said substrate having a weight of about 1 to about 100 grams/ft$^2$.

16. The method of claim 15 wherein the coating composition is applied to said substrate in quantities such that subsequent to its curing it will form a layer upon said substrate having a weight of about 5 to about 40 grams/ft$^2$.

17. The method of claim 1 wherein curing of said coating composition is conducted at temperature ranging from about 300° F. to about 700° F. for a period of between about 0.5 to about 4 minutes.

18. A method of preventing or minimizing humidity-induced sag in bonded particulate substrates a coating composition comprising an aqueous dispersion of an effective amount of mixture of a resin selected from the group of dimethylol dihydroxy ethylene urea, tetramethylol glycoluril and mixtures thereof, an effective amount of a starch *which contains less than about 50% by weight of insolubles,* and an effective amount a filler selected from the group consisting of kaolin, bentenite, clays, alkali metal carbonates and mixtures thereof, said dimethylol dihydroxy ethylene urea and starch being present in about a 1:1 weight % ratio and said composition being applied in quantities sufficient to result, upon curing, in a layer upon said substrate having a weight of about 5 to about 40 grams/ft$^2$ of substrate, and curing said composition at a temperature of between about 250° F. to about 375° F. for a time sufficient to result in curing of said composition.

19. A bonded particulate article resistant to humidity-induced sag produced in accordance with the method of claim 1.

20. A bonded particulate article resistant to humidity-induced sag produced in accordance with the method of claim 18.

* * * * *